United States Patent
Crane et al.

(10) Patent No.: US 11,514,728 B2
(45) Date of Patent: Nov. 29, 2022

(54) DRIVE SYSTEM FOR ROTATING A WHEEL OF A LANDING GEAR HAVING A TRANSMISSION ERROR MEASUREMENT APPARATUS

(71) Applicant: AIRBUS OPERATIONS LIMITED, Bristol (GB)

(72) Inventors: Nicholas Crane, Bristol (GB); Arnaud Didey, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 948 days.

(21) Appl. No.: 16/285,668

(22) Filed: Feb. 26, 2019

(65) Prior Publication Data

US 2019/0263508 A1 Aug. 29, 2019

(30) Foreign Application Priority Data

Feb. 27, 2018 (GB) ..................... 1803147

(51) Int. Cl.
*B64C 25/40* (2006.01)
*G07C 5/00* (2006.01)
(Continued)

(52) U.S. Cl.
CPC ............ *G07C 5/006* (2013.01); *B64C 25/405* (2013.01); *F16D 3/065* (2013.01); *F16H 1/00* (2013.01);
(Continued)

(58) Field of Classification Search
CPC ......... B64C 25/405; B64D 2045/0085; G01M 13/02; G07C 5/006; G07C 5/008; G07C 5/0808; G07C 5/0816; G07C 5/085
See application file for complete search history.

(56) References Cited

U.S. PATENT DOCUMENTS

2004/0075022 A1* 4/2004 MacKness ............... B64C 25/36
244/100 R
2012/0160956 A1* 6/2012 Gaia ..................... B64C 25/405
244/50
(Continued)

FOREIGN PATENT DOCUMENTS

EP 2982603 2/2016
EP 3048044 7/2016
(Continued)

OTHER PUBLICATIONS

European Search Report for European Application No. 19159279.9, nine pages, dated Jul. 23, 2019.
(Continued)

*Primary Examiner* — Eric S. McCall
(74) *Attorney, Agent, or Firm* — Nixon & Vanderhye P.C.

(57) ABSTRACT

A drive system 20, 20' for rotating a wheel 11, 11' of an aircraft landing gear 10, 10', is disclosed having a drive element 24, 24', a motor 21, 21' operable to rotate the drive element, and a driven gear 25, 25' adapted to be attached to the wheel. The drive system has a drive configuration in which the drive element is capable of meshing with the driven gear to drive the driven gear, wherein the drive system further comprises a transmission error measurement apparatus 30, 40, the apparatus configured to obtain, over time, measurement data of one or more characteristics of the drive system when in the drive configuration, the measurement data providing an indication of a transmission error between a torque commanded by the motor and a resulting torque at the driven gear. An aircraft 100 and a method of providing an indication of a transmission error in a drive system is disclosed.

30 Claims, 3 Drawing Sheets

(51) Int. Cl.
| | |
|---|---|
| *F16D 3/06* | (2006.01) |
| *F16H 1/24* | (2006.01) |
| *F16H 57/01* | (2012.01) |
| *F16H 1/00* | (2006.01) |
| *G07C 5/08* | (2006.01) |
| *G07C 5/02* | (2006.01) |
| *G01M 13/02* | (2019.01) |
| *F16D 3/18* | (2006.01) |
| *B64D 45/00* | (2006.01) |

(52) U.S. Cl.
CPC ............... *F16H 1/24* (2013.01); *F16H 57/01* (2013.01); *G01M 13/02* (2013.01); *G07C 5/004* (2013.01); *G07C 5/008* (2013.01); *G07C 5/02* (2013.01); *G07C 5/08* (2013.01); *G07C 5/085* (2013.01); *G07C 5/0808* (2013.01); *G07C 5/0816* (2013.01); *G07C 5/0841* (2013.01); *B64D 2045/0085* (2013.01); *F16D 3/185* (2013.01)

(56) References Cited

U.S. PATENT DOCUMENTS

| | | | |
|---|---|---|---|
| 2013/0240664 A1 | 9/2013 | Cox et al. | |
| 2015/0027256 A1* | 1/2015 | Rodrigues | B64C 25/44 74/411.5 |
| 2015/0266566 A1* | 9/2015 | Ivandaev | B64C 25/405 244/50 |
| 2016/0039519 A1* | 2/2016 | Didey | B64C 25/34 244/103 S |
| 2016/0052642 A1 | 2/2016 | Gordon et al. | |
| 2016/0152326 A1* | 6/2016 | Martin | B64C 25/44 74/413 |
| 2016/0214709 A1* | 7/2016 | Rodrigues | B64C 25/405 |
| 2016/0221669 A1* | 8/2016 | Didey | B64C 25/34 |
| 2017/0001718 A1* | 1/2017 | Didey | B64C 25/42 |
| 2017/0101173 A1* | 4/2017 | Morris | F16H 1/24 |
| 2017/0106974 A1* | 4/2017 | Morris | B64C 25/34 |
| 2017/0137119 A1* | 5/2017 | Didey | F16H 57/042 |
| 2017/0174329 A1* | 6/2017 | Wilson | B64C 25/34 |
| 2017/0197707 A1* | 7/2017 | Morris | H02P 31/00 |
| 2018/0170528 A1* | 6/2018 | Roques | B64C 25/50 |
| 2020/0180752 A1* | 6/2020 | Boissard | B64C 25/34 |

FOREIGN PATENT DOCUMENTS

| | | |
|---|---|---|
| EP | 3 284 671 | 2/2018 |
| GB | 2398619 | 8/2004 |
| GB | 2523780 | 9/2015 |
| GB | 2524242 | 9/2015 |
| WO | 2012/048225 | 4/2012 |
| WO | 2014/023939 | 2/2014 |
| WO | 2014/023941 | 2/2014 |
| WO | 2015/140520 | 9/2015 |
| WO | 2015/150776 | 10/2015 |

OTHER PUBLICATIONS

Extended European Search Report for Application No. EP 21210899.7, 11 pages, dated Apr. 7, 2022.

* cited by examiner

DRIVE SYSTEM FOR ROTATING A WHEEL OF A LANDING GEAR HAVING A TRANSMISSION ERROR MEASUREMENT APPARATUS

CROSS RELATED APPLICATION

This application claims priority to United Kingdom (GB) Patent Application 1803147.6, filed Feb. 27, 2018, the entire contents of which are hereby incorporated by reference.

BACKGROUND OF THE INVENTION

The present disclosure relates to drive systems for rotating a wheel of an aircraft landing gear.

The present invention concerns a drive system for rotating a wheel of an aircraft landing gear. More particularly, but not exclusively, this invention concerns a drive system for rotating a wheel of an aircraft landing gear, the drive system comprising a drive element, a motor operable to rotate the drive element, and a driven gear adapted to be attached to the wheel so as to be capable of rotating the wheel, wherein the drive system has a drive configuration in which the drive element is capable of meshing with the driven gear to drive the driven gear.

The invention also concerns an aircraft and a method of providing an indication of a transmission error in a drive system for rotating a wheel of an aircraft landing gear.

Transmission error is caused by a drive element and driven gear not being perfectly aligned during engagement (meshing). This could be caused by misalignment during installation, deflections during use (such as manoeuvres like braking, steering and landing or when moving in and out of the driving configuration) or wear of the drive element and driven gear. Drive systems for driving a wheel of an aircraft landing gear are known, such as in WO 2015/140520. In this arrangement, the drive system is provided with a rotary damper in the drive path between the motor and drive pinion (drive element). The rotary damper acts to protect the drive path by reducing the oscillations experienced that are caused by transmission error between the drive pinion and driven gear. However, there is a limit to the amount of transmission error that the rotary damper (or other compliance device) can absorb. There may come a time when the vibrations experienced by the drive system are causing damage to the drive system, or landing gear, even with a compliance device in place.

Another example of a drive system is US 2013/240664 where a drive pinion speed is matched to an aircraft air speed (for example, prior to landing). Speed sensors are used to do this. In addition, they may be used, in real time, to help control ground manoeuvres.

However, it is not known in such either arrangement how much vibration is actually being caused, or an indication of the damage that could be being caused to the drive system by any transmission errors.

The present invention seeks to mitigate the above-mentioned problems. Alternatively or additionally, the present invention seeks to provide an improved drive system.

SUMMARY OF THE INVENTION

The present invention provides, according to a first aspect, a drive system for rotating a wheel of an aircraft landing gear, the drive system comprising a drive element, such as a drive pinion, a motor operable to rotate the drive element, and a driven gear adapted to be attached to the wheel so as to be capable of rotating the wheel, wherein the drive system has a drive configuration in which the drive element is capable of meshing with the driven gear to drive the driven gear, wherein the drive system further comprises a transmission error measurement apparatus, the apparatus configured to obtain (over time) measurement data of one or more characteristics of the drive system when in the drive configuration, the measurement data providing an indication of a transmission error between a torque commanded by the motor and a resulting torque at the driven gear.

Having a transmission error measurement apparatus allows the transmission error and/or vibration levels experienced by the drive system, or parts of it, to be assessed. These could be monitored and used to consider the amount of damage that the drive system might be experiencing. This could be used to plan or schedule maintenance/repair programmes for the drive system.

The term "over time" is used to indicate that the measurement data is obtained at different times and is not a single measurement. This is done so that a trend in the measurement data can be seen. It also allows for patterns (for example, over the rotation cycle of the drive element/driven gear or other cycle in the drive system) in the measurement data to be seen, for example a torque, speed or vibration level oscillation over the drive system cycle. The drive system cycle may correspond to a tooth/other meshing profile of the driven gear and/or drive element. For example, the cycle may occur over the time taken for one tooth mesh cycle of a tooth of a sprocket driven gear with a roller gear drive element. The drive element may comprise a drive chain, driven around one or more drive gears, the drive chain being capable of meshing with the driven gear (e.g. a sprocket) to drive the driven gear, in the drive configuration. Preferably, the apparatus is configured to compare a characteristic of the measurement data of a cycle to the same characteristic of the measurement data of a previous cycle, or to an expected characteristic of a cycle, whereby the difference of the compared characteristics is an indication of the transmission error. The characteristic of the measurement data of a cycle may be the difference between a maximum and minimum amplitude of speed, torque or vibration level oscillation of a cycle. The cycle may be a rotation cycle of the drive element/driven gear, or a meshing cycle, such as corresponding to a tooth or other meshing profile of the driven gear and/or drive element.

The aircraft landing gear may be a main or nose aircraft landing gear.

Preferably, the transmission error measurement apparatus comprises a data transfer device so that the measurement data obtained can be transferred for later analysis. For example, the measurement data could be transferred to a ground station and/or analysis computer by transmission (e.g. infra-red, blue-tooth etc.) or by physical connection between the data transfer device and a ground station/analysis computer or portable storage device (e.g. USB stick).

Preferably, the transmission error measurement apparatus comprises a data storage device so that the measurement data obtained can be stored for later analysis.

Preferably, the drive element and driven gear comprise a roller gear and sprocket.

More preferably, the drive element comprises a roller gear and the driven gear comprises a sprocket.

Preferably, the transmission error measurement apparatus comprises a speed sensor device, for measuring, over time, a rotational speed of a part of the drive system when in the drive configuration. This allows the speed of that part to be considered over time so that any differences between the expected speed (for example, the speed of the motor that drives the rotation) and the actual speed (for example, the actual speed of the part) can be considered. Preferably, the pattern of the speed of the part over a certain period of time can be considered. For example, over one or more cycles of rotation of the drive system (such as tooth meshing), the pattern of the speed of the part can be considered and any difference between, for example, a maximum or minimum speed can be used as an indication of a transmission error.

More preferably, the speed sensor device is located on the drive element or driven gear for measuring, over time, a rotational speed of the drive element or driven gear, respectively, when in the drive configuration.

Even more preferably, the speed sensor device is located on the drive element for measuring, over time, a rotational speed of the drive element when in the drive configuration.

Preferably, the transmission error measurement apparatus comprises a motor speed indication measurement device, for measuring, over time, an indication of the rotational speed of the motor when in the drive configuration. This can be used as an indication of the expected speed of the part.

More preferably, the motor speed indication measurement device comprises i) a motor speed sensor device for measuring, over time, a rotational speed of the motor when in the drive configuration, or ii) a motor current measurement device for measuring, over time, a supplied current to the motor when in the drive configuration.

Preferably, the motor speed indication measurement device is also configured to be used, upon approach to landing of the aircraft, to match the rotational speed of the motor to a flight speed of the aircraft, prior to the drive system being configured in the drive configuration (i.e. prior to meshing of the drive element and driven gear).

Preferably, the transmission error measurement apparatus comprises a torque sensor device, for measuring, over time, a torque on a part of the drive system when in the drive configuration. This allows the rotational torque on that part to be considered over time so that any differences between the expected torque (for example, the torque of the motor that drives the rotation) and the actual torque (for example, the actual torque of the part) can be considered. Preferably, the pattern of the torque of the part over a certain period of time can be considered. For example, over one or more cycles of rotation of the drive system (such as tooth meshing), the pattern of the torque of the part can be considered and any difference between, for example, a maximum or minimum torque can be used as an indication of a transmission error.

More preferably, the torque sensor device is located on the drive element or driven gear for measuring, over time, a rotational torque on the drive element or driven gear, respectively, when in the drive configuration.

Even more preferably, the torque sensor device is located on the drive element for measuring, over time, a rotational torque on the drive element when in the drive configuration.

Preferably, the transmission error measurement apparatus comprises a motor torque indication measurement device, for measuring, over time, an indication of the rotational torque provided by the motor when in the drive configuration. This can be used as an indication of the expected rotational torque on the part.

More preferably, the motor torque indication measurement device comprises i) a motor torque sensor device for measuring, over time, a rotational torque provided by the motor when in the drive configuration, or ii) a motor current measurement device for measuring, over time, a supplied current to the motor when in the drive configuration.

Preferably, the transmission error measurement apparatus comprises a vibration sensor device, for measuring, over time, vibrations on a part of the drive system when in the drive configuration. This provides an indication of the vibration experienced by the part. Preferably, the pattern of the vibration level of the part over a certain period of time can be considered.

More preferably, the vibration sensor device comprises an accelerometer.

Preferably, the vibration sensor device is located on a part of the drive system that does not rotate when the driven gear is driven in the drive configuration. This allows electrical connectors of the vibration sensor device to be more easily provided (i.e. to a largely stationary element, rather than a rotating one).

More preferably, the non-rotating part may be a casing of the motor or gearbox.

Preferably, the vibration sensor device includes a filter to filter out vibrations caused by isolated events, such as a manoeuvre of the aircraft. This means that these "once-off" (and often large value) vibrations are ignored and the (smaller) cyclic vibrations caused by transmission error can be considered in isolation.

According to a second aspect of the invention there is also provided an aircraft comprising the drive system as described above.

According to a third aspect of the invention there is also provided a method of providing an indication of a transmission error in a drive system for rotating a wheel of an aircraft landing gear, the drive system comprising a drive element, such as a drive pinion, a motor operable to rotate the drive element, and a driven gear adapted to be attached to the wheel so as to be capable of rotating the wheel, wherein the method includes the steps of configuring the drive system in a drive configuration in which the drive element is capable of meshing with the driven gear to drive the driven gear, and obtaining (over time) measurement data of one or more characteristics of the drive system when in the drive configuration, the measurement data providing an indication of a transmission error between a torque commanded by the motor and a resulting torque at the driven gear.

By obtaining measurement data providing an indication of a transmission error, between a torque commanded by the motor and a resulting torque at the driven gear, allows the transmission error and/or vibration levels experienced by the drive system, or parts of it, to be assessed. These could be monitored and used to consider the amount of damage that the drive system might be experiencing. This could be used to plan or schedule maintenance/repair programmes for the drive system.

The term "over time" is used to indicate that the measurement data is obtained at different times and is not a single measurement. This is done so that a trend in the measurement date can be seen. It also allows for patterns (for example, over the rotation cycle of the drive element/driven gear or other cycle in the drive system) in the measurement data to be seen, for example a torque, speed or vibration level oscillation over the drive system cycle. The drive system cycle may correspond to a tooth/other meshing profile of the driven gear and/or drive element. For example, the cycle may occur over the time taken for one tooth mesh cycle of a tooth of a sprocket driven gear with a roller gear drive element. Preferably, the method comprises comparing a characteristic of the measurement data of a cycle to the same characteristic of the measurement data of a previous cycle, or to an expected characteristic of the cycle, whereby the difference of the compared characteristics is an indication of the transmission error. The characteristic of the measurement data of a cycle may be the difference between a maximum and minimum amplitude of speed, torque or vibration level oscillation of a cycle. The cycle may be a rotation cycle of the drive element/driven gear, or a meshing cycle, such as corresponding to a tooth or other meshing profile of the driven gear and/or drive element.

Preferably, the measurement data obtained is transferred, either by streaming or by a data connection, to a computer and wherein the computer analyses the data or wherein the measurement data is at least partly analysed by the drive system.

Preferably, the measurement data obtained is stored for later analysis.

Preferably, the method comprises the steps of obtaining, over time, an indication of the rotational speed, or torque, of the motor when in the drive configuration, obtaining, over time, a rotational speed, or torque, of a part of the drive system, such as the drive element or driven gear, when in the drive configuration, comparing, over the time period of the measurement data, the part rotational speed, or torque, and the motor rotational speed, or torque, and providing an indication of a speed, or torque, difference, and using the speed, or torque, difference to provide an indication of the amount of transmission error in the drive system.

Preferably, the method comprises the steps of measuring, over time, vibrations on a part of the drive system when in the drive configuration, filtering out vibrations caused by isolated events, such as a manoeuvre of the aircraft, and using the vibration data to provide an indication of the amount of transmission error in the drive system.

Preferably, the method comprises the step of considering a trend in the indicated transmission error over time. For example, a trend of increasing transmission error over time may provide an indication of required maintenance/repair in the future.

Preferably, the method comprises the step of analysing if the indicated transmission error has exceeded a pre-set limit. This pre-set limit may provide a signal to initiate scheduling of maintenance/repair to prevent damage to the drive system and/or landing gear.

Preferably, the method comprises the step of using the indication to decide on a maintenance/repair schedule for the drive system. For example, this could be based on the expected time period before the indicated transmission error will exceed a pre-set limit.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
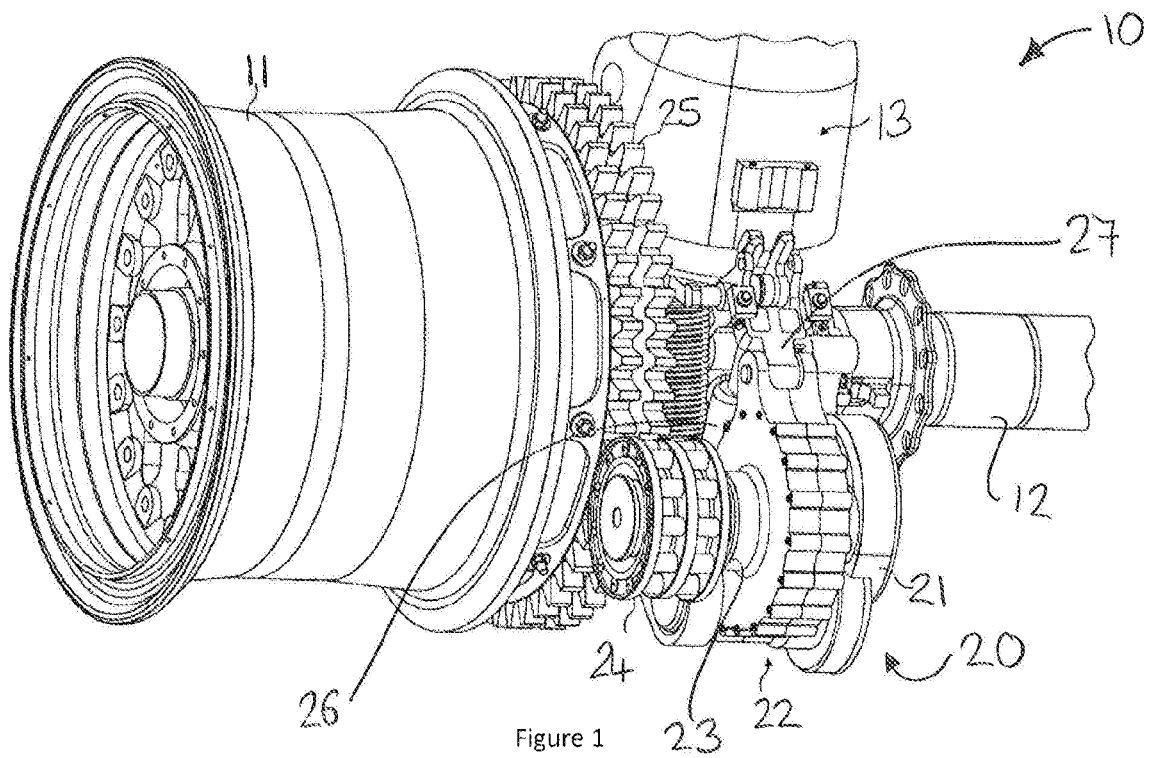
FIG. 1 shows a perspective view of a main aircraft landing gear, including a drive system according to a first embodiment of the invention.

FIG. 1 shows a perspective view of a main aircraft landing gear 10, including a drive system 20 according to a first embodiment of the invention.

The aircraft landing gear 10 comprises a landing gear leg 13, an axle 12 and a wheel 11 rotatably mounted on the axle 12. The drive system 20 for rotating the wheel 11 is attached beneath the landing gear leg 13. The drive system 20 comprises a drive pinion roller gear 24, a motor 21 operable to rotate the drive pinion roller gear 24 via a gearbox 22 and gearbox output shaft 23, and a driven sprocket gear 25 attached to the wheel 11 so as to be capable of rotating the wheel 11. A drive path from the motor 21 to the wheel 11 is defined including the gearbox 22, gearbox output shaft 23, drive pinion roller gear 24 and driven sprocket gear 25.

The drive system has a drive configuration shown in FIG. 1 in which the drive pinion roller gear 24 meshes with the driven sprocket gear 25 to permit the motor 21 to drive the driven sprocket gear 25.

In more detail, the drive pinion roller gear 24 comprises a series of rollers arranged to form two rings, each roller being rotatable about a roller axis at a fixed distance from an axis of rotation. The driven sprocket gear 25 comprises a two sprocket rings to mesh with the two roller rings.

A variety of suitable rollers gears are described in WO-A-2014/023939 and WO-A-2014/023941, the contents of which are incorporated herein by reference.

The drive pinion roller gear 24 is switchable between the drive configuration of FIG. 1 and a neutral configuration in which the drive pinion roller gear is not capable of meshing with the driven sprocket gear. WO-A-2014/023939 and WO-A-2014/023941 describe various methods of switching between the drive configuration and the neutral configuration. In FIG. 1, a linkage 27 and an actuator 26 are used to move between drive and neutral configurations.

The gearbox 22 comprises a set of meshed gears. The set of gears provide a desired gearing ratio between an output shaft of the motor 21 and the output shaft 23 of the gearbox.

Figure 2:
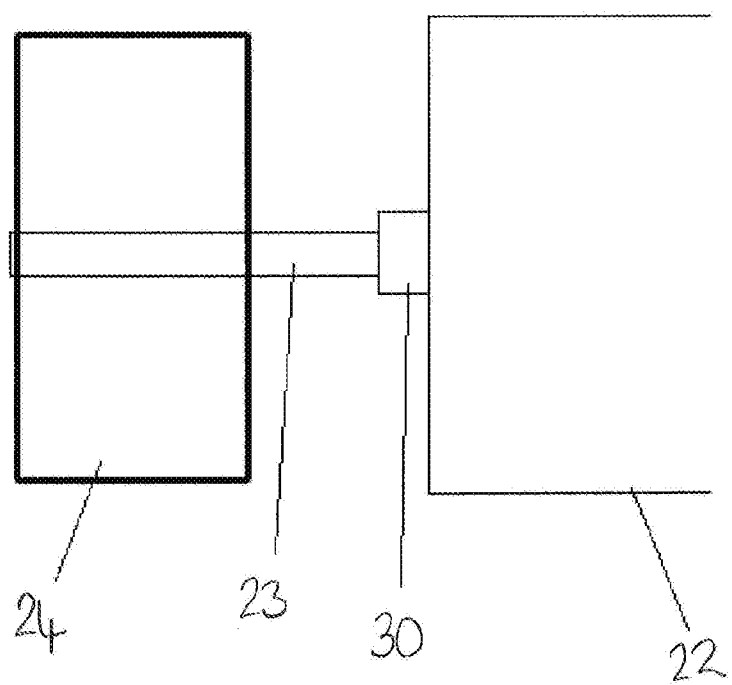
FIG. 2 shows an enlarged schematic view of part of the drive system of FIG. 1, showing the location of a speed sensor.

The drive system 20 also comprises a speed sensor 30, as shown in FIG. 2. FIG. 2 shows an enlarged schematic view of part of the drive system 20 of FIG. 1, showing the location of a speed sensor 30 on the output shaft 23 of the gearbox 22, adjacent to the gearbox 22.

This speed sensor 30 is a magnetic sensor. The output shaft 23 has a magnetic toothed profile contained within the speed sensor 30. As the output shaft 23 rotates, the magnetic field around the sensor 30 changes, which generates a voltage which can be measured. This voltage will be proportional to the output shaft 23 rotational speed and so an indication of the rotational speed of the output shaft 23 and hence an indication of the rotational speed of the drive pinion roller gear 24.

Figure 3:
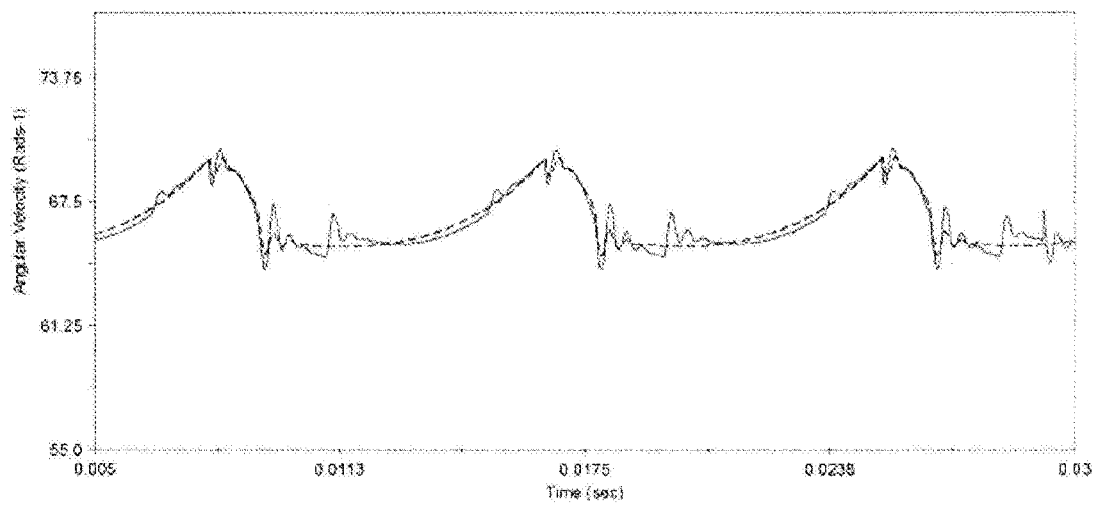
FIG. 3 is a graph showing two examples of how the angular velocity of a roller gear, such as that in the drive system of FIG. 1, may vary over time, when in the drive configuration.

FIG. 3 is a graph showing two examples of how the angular velocity (rotational speed, or speed) of a drive pinion (roller gear), such as that in the drive system of FIG. 1, may vary over time, when in the drive configuration. It can be seen that the speed is in the form of a cycle, corresponding to a tooth mesh cycle of the drive pinion with a driven (sprocket) gear.

The angular velocity (speed) has a maximum and minimum and the difference of these can be used as an indication of the transmission error experienced. For example, if the difference between the maximum and minimum speed is large, this is an indication of a significant difference in the amount of torque transfer from the motor during the mesh cycle, and hence an indication of a large transmission error. An alternative way to obtain an indication of transmission error would be to compare the speed of the drive pinion at a given point in time to a speed of the motor (either using an additional speed sensor mounted on the motor, to obtain an actual motor speed, or using a motor input signal such as a speed command or supplied current/voltage to the motor, to obtain an expected motor speed) at that same point in time. This motor speed sensor or input motor signal may also be used, upon approach to landing of the aircraft, to match the rotational speed of the motor to a flight speed of the aircraft, prior to the drive system 20 being configured in the drive configuration.

In use, when in the drive configuration, the drive system 20 is used to drive the wheel 11 of the landing gear 10. When in the drive configuration, the speed sensor 30 measures and stores or transfers measurement data of the rotational speed of the output shaft 23 over time. This data is used, as described above, to provide an indication of the transmission error in the drive system 20. This indication may be used to plan or schedule maintenance or repair of the drive system 20 or landing gear 10.

Figure 4:
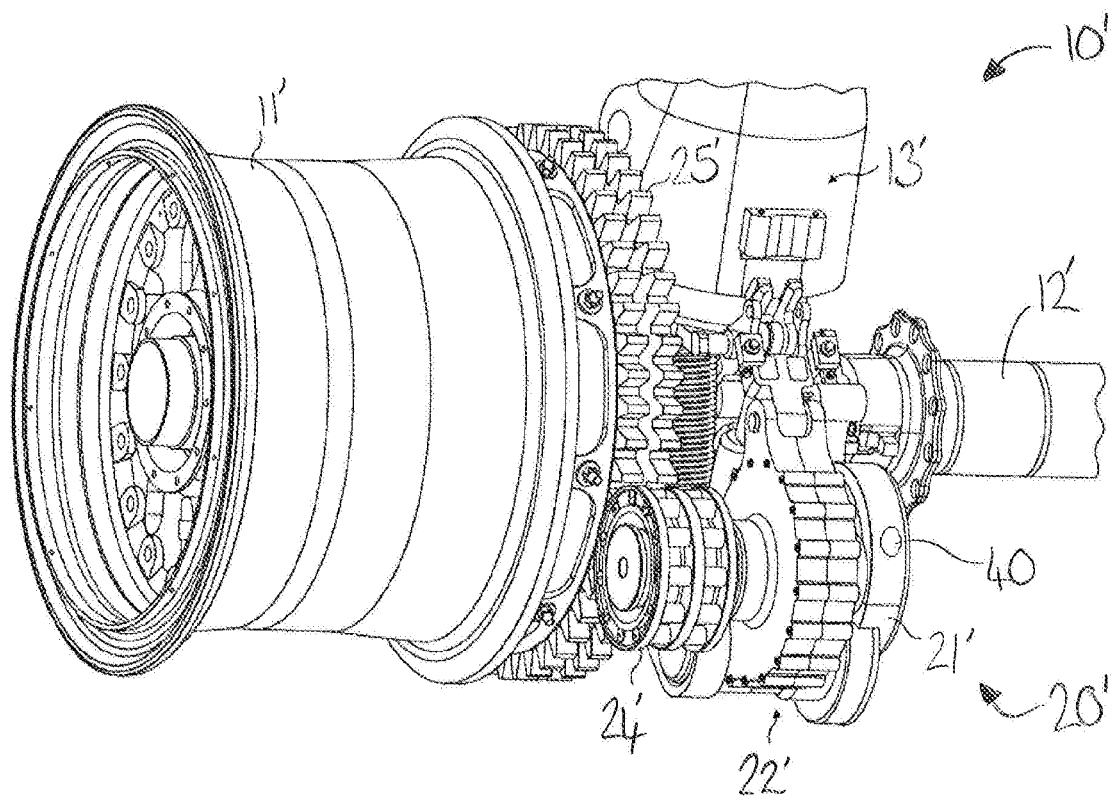
FIG. 4 shows a perspective view of a main aircraft landing gear, including a drive system according to a second embodiment of the invention.

FIG. 4 shows a perspective view of a main aircraft landing gear 10', including a drive system 20' according to a second embodiment of the invention. The second embodiment is similar to the first embodiment with like elements being shown with a ' after the reference numeral (for example 12' refers to the axle of the second embodiment and 13' refers to the landing gear leg of the second embodiment). The differences of the second embodiment will now be described.

The drive system 20' does not comprise the speed sensor 30. Instead, the drive system 20' includes an accelerometer 40 mounted on the outside of the casing of the motor 21'. The accelerometer 40 measures the vibrations experienced at the motor casing and hence provides an indirect indication of the amount of transmission error experienced.

Figure 5:
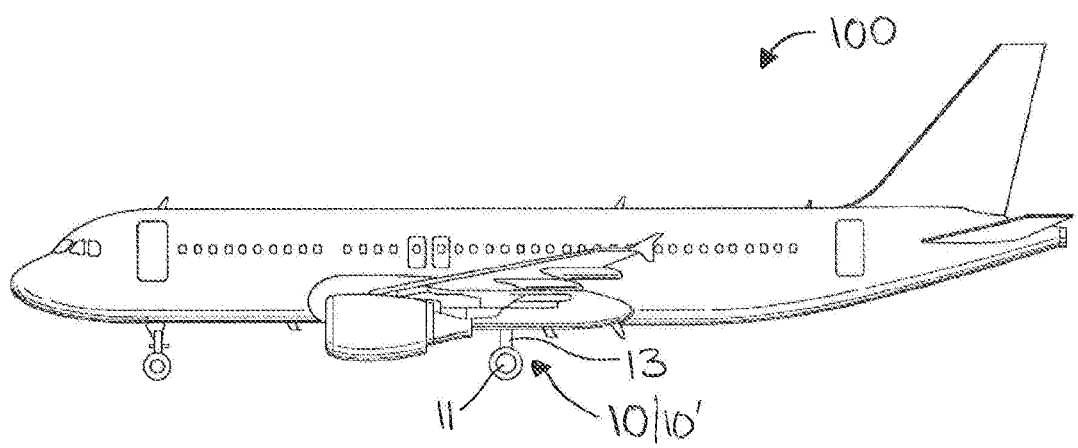
FIG. 5 shows an aircraft, including the main landing gear of FIG. 1 or FIG. 4.

FIG. 5 shows an aircraft 100, including either the main landing gear of FIG. 1, gear 10, or FIG. 4, gear 10'.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The gearbox used may be a parallel axis gearbox, rather than a comprising a series of meshed gears in the drive path.

The roller gear drive pinion may be replaced by a drive chain, driven around one or more drive gears. The roller gear and sprocket gear may be the other way round with the roller gear provided on the driven gear, and the pinion gear comprising a sprocket. The roller gear and sprocket gear may contain a different number of rows.

The drive path may include a rotary damper. Further details of a suitable are described in GB-A-2398619 and WO-A-2015/140520, the contents of which are incorporated herein by reference.

An alternative to the first embodiment is to use a torque sensor, rather than a speed sensor 30. The torque sensor could comprise a strain gauge mounted on the output shaft of the gearbox. There may be a slip ring in the torque sensor housing to apply power to and retrieve the signal from the strain gauge of the torque sensor. Importantly, the torque on the roller gear (drive pinion), and also on the output shaft of the gearbox, will take the form of a similar cycle to the speed shown in FIG. 3. I.e. the torque measured by sensor 30' would have a maximum and minimum over each cycle and the difference of these can be used as an indication of the transmission error experienced. For example, if the difference between the maximum and minimum torque is large, this is an indication of a significant difference in the amount of torque transfer from the motor during the mesh cycle, and hence an indication of a large transmission error. A further alternative way to obtain an indication of transmission error would be to compare the torque of the drive pinion (or output shaft of the gearbox) at a given point in time to a torque provided by the motor (either using an additional torque sensor mounted on the motor, to obtain an actual motor torque, or using a motor input signal such as a torque command or supplied current/voltage to the motor, to obtain an expected motor torque) at that same point in time.

An alternative to the second embodiment is to mount the accelerometer 40 anywhere on the motor 21', gearbox 22' or (roller gear) drive pinion 24'. It is advisable to have the accelerometer on a non-rotating part, such as the motor or gearbox, to make electrical and data connections easier.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

It should be noted that throughout this specification, "or" should be interpreted as "and/or".

The invention claimed is:

1. A drive system for rotating a wheel of an aircraft landing gear, the drive system comprising:
   a drive element,
   a motor operable to rotate the drive element, and
   a driven gear adapted to be attached to the wheel so as to be capable of rotating the wheel,
wherein the drive system has a drive configuration in which the drive element is capable of meshing with the driven gear to drive the driven gear,
wherein the drive system further comprises a transmission error measurement apparatus, the apparatus configured to obtain, over time, measurement data of one or more characteristics of the drive system when in the drive configuration, the measurement data providing an indication of a transmission error between a torque commanded by the motor and a resulting torque at the driven gear, and
wherein the apparatus is configured to compare a characteristic of the measurement data of a cycle to the same characteristic of the measurement data of a previous cycle, whereby the difference of the compared characteristics is an indication of the transmission error.

2. A drive system as claimed in claim 1, wherein the transmission error measurement apparatus comprises a data transfer device so that the measurement data obtained can be transferred for later analysis.

3. A drive system as claimed in claim 1, wherein the transmission error measurement apparatus comprises a data storage device so that the measurement data obtained can be stored for later analysis.

4. An aircraft comprising the drive system of claim 1.

5. A drive system as claimed in claim 1, wherein the drive element and driven gear comprise a roller gear and sprocket.

6. A drive system as claimed in claim 5, wherein the drive element comprises a roller gear and the driven gear comprises a sprocket.

7. A drive system as claimed in claim 1, wherein the transmission error measurement apparatus comprises a speed sensor device, for measuring, over time, a rotational speed of a part of the drive system when in the drive configuration.

8. A drive system as claimed in claim 7, wherein the speed sensor device is located on the drive element or driven gear for measuring, over time, a rotational speed of the drive element or driven gear, respectively, when in the drive configuration.

9. A drive system as claimed in claim 8, wherein the speed sensor device is located on the drive element for measuring, over time, a rotational speed of the drive element when in the drive configuration.

10. A drive system as claimed in claim 7, wherein the transmission error measurement apparatus comprises a motor speed indication measurement device, for measuring, over time, an indication of the rotational speed of the motor when in the drive configuration.

11. A drive system as claimed in claim 10, wherein the motor speed indication measurement device comprises i) a motor speed sensor device for measuring, over time, a rotational speed of the motor when in the drive configuration, or ii) a motor current measurement device for measuring, over time, a supplied current to the motor when in the drive configuration.

12. A drive system as claimed in claim 10, wherein the motor speed indication measurement device is also configured to be used, upon approach to landing of the aircraft, to match the rotational speed of the motor to a flight speed of the aircraft, prior to the drive system being configured in the drive configuration.

13. A drive system as claimed in claim 1, wherein the transmission error measurement apparatus comprises a torque sensor device, for measuring, over time, a torque on a part of the drive system when in the drive configuration.

14. A drive system as claimed in claim 13, wherein the torque sensor device is located on the drive element or driven gear for measuring, over time, a rotational torque on the drive element or driven gear, respectively, when in the drive configuration.

15. A drive system as claimed in claim 14, wherein the torque sensor device is located on the drive element for measuring, over time, a rotational torque on the drive element when in the drive configuration.

16. A drive system as claimed in claim 13, wherein the transmission error measurement apparatus comprises a motor torque indication measurement device, for measuring, over time, an indication of the rotational torque provided by the motor when in the drive configuration.

17. A drive system as claimed in claim 16, wherein the motor torque indication measurement device comprises i) a motor torque sensor device for measuring, over time, a rotational torque provided by the motor when in the drive configuration, or ii) a motor current measurement device for measuring, over time, a supplied current to the motor when in the drive configuration.

18. A drive system for rotating a wheel of an aircraft landing gear, the drive system comprising:
a drive element,
a motor operable to rotate the drive element, and
a driven gear adapted to be attached to the wheel so as to be capable of rotating the wheel,
wherein the drive system has a drive configuration in which the drive element is capable of meshing with the driven gear to drive the driven gear,
wherein the drive system further comprises a transmission error measurement apparatus comprising a vibration sensor device, for measuring, over time, vibrations on a part of the drive system, the transmission error measurement apparatus being configured to use vibration data resulting from the vibration sensor device to provide and indication of a transmission error.

19. A drive system as claimed in claim 18, wherein the vibration sensor device comprises an accelerometer.

20. A drive system as claimed in claim 18, wherein the vibration sensor device includes a filter to filter out vibrations caused by isolated events.

21. A drive system as claimed in claim 18, wherein the vibration sensor device is located on a part of the drive system that does not rotate when the driven gear is driven in the drive configuration.

22. A drive system as claimed in claim 21, wherein the non-rotating part may be a casing of the motor or gearbox.

23. A method of providing an indication of a transmission error in a drive system for rotating a wheel of an aircraft landing gear, the drive system comprising a drive element, a motor operable to rotate the drive element, and a driven gear adapted to be attached to the wheel so as to be capable of rotating the wheel, wherein the method includes the steps of:
configuring the drive system in a drive configuration in which the drive element is capable of meshing with the driven gear to drive the driven gear, and
obtaining, over time, measurement data of one or more characteristics of the drive system when in the drive configuration, the measurement data providing an indication of a transmission error between a torque commanded by the motor and a resulting torque at the driven gear, and
wherein the method comprises comparing a characteristic of the measurement data of a cycle to the same characteristic of the measurement data of a previous cycle, whereby the difference of the compared characteristics is an indication of the transmission error.

24. A method as claimed in claim 23, wherein the measurement data obtained is transferred, either by streaming or by a data connection, to a computer and wherein the computer analyses the data or wherein the measurement data is at least partly analysed by the drive system.

25. A method as claimed in claim 23, wherein measurement data obtained is stored for later analysis.

26. A method as claimed in claim 23, wherein the method comprises the steps of:
measuring, over time, vibrations on a part of the drive system when in the drive configuration,
filtering out vibrations caused by isolated events, and
using the vibration data to provide an indication of the amount of transmission error in the drive system.

27. A method as claimed in claim 23, wherein the method comprises the steps of:
- obtaining, over time, an indication of the rotational speed, or torque, of the motor when in the drive configuration,
- obtaining, over time, a rotational speed, or torque, of a part of the drive system, when in the drive configuration,
- comparing, over the time period of the measurement data, the part rotational speed, or torque, and the motor rotational speed, or torque, and providing an indication of a speed, or torque, difference, and
- using the speed, or torque, difference to provide an indication of the amount of transmission error in the drive system.

28. A method as claimed in claim 27, wherein the method comprises the step of considering a trend in the indicated transmission error over time.

29. A method as claimed in claim 27, wherein the method comprises the step of analysing if the indicated transmission error has exceeded a pre-set limit.

30. A method as claimed in claim 27, wherein the method comprises the step of using the indication to decide on a maintenance/repair schedule for the drive system.

\* \* \* \* \*